United States Patent [19]
Derie

[11] 3,724,115
[45] Apr. 3, 1973

[54] FISHING DEVICE

[76] Inventor: Clifford Derie, 16 Sackville Drive, S.W., Calgary, Alberta, Canada

[22] Filed: Nov. 8, 1971

[21] Appl. No.: 196,524

[52] U.S. Cl. ........................................ 43/15, 43/21.1
[51] Int. Cl. ........................ A01k 97/00, A01k 97/10
[58] Field of Search ........................... 43/15, 16, 21.2

[56] References Cited

UNITED STATES PATENTS

| | | | |
|---|---|---|---|
| 2,606,731 | 8/1952 | Harris | 43/21.2 |
| 2,752,115 | 6/1956 | Green | 43/21.2 UX |
| 2,766,543 | 10/1956 | Beck | 43/16 |
| 2,774,563 | 12/1956 | Pribis | 43/21.2 X |
| 2,984,039 | 5/1961 | Willey | 43/15 |

*Primary Examiner*—Antonio F. Guida
*Assistant Examiner*—Daniel J. Leach
*Attorney*—C. C. Kent et al.

[57] ABSTRACT

A support for a fishing rod comprising a base with means thereon to support the rod at an inclined angle. The rod butt is held adjacent one end of the base and a member extending upwardly from the base supports the rod at an intermediate point thereof. Another member having a hooked end to detachably hold the rod adjacent the tip end under tension is pivotally secured adjacent to the other end of the base. When the rod tip is pulled downwardly the hooked end is released and the rod snaps upwardly to set the hook in the fish's mouth. The base is foldable and includes means to store the component parts therein.

12 Claims, 5 Drawing Figures

PATENTED APR 3 1973 3,724,115

FISHING DEVICE

BACKGROUND OF THE INVENTION

This invention relates to new and useful improvements in fishing devices and constitutes means to support a fishing rod in the fishing position whereby a fish striking the lure, releases a trigger so that the normal resiliency of the rod causes the hook to set.

There are many devices which are designed to automatically set a hook when a fish is caught but these normally constitute a specially built fishing device which may include a line but does not include a rod which is detachable so that the fish can be played after the strike has occurred.

SUMMARY OF THE INVENTION

The present device overcomes disadvantages inherent in the majority of conventional devices because it provides a support for a conventional fishing rod which can easily be removed from the device once a fish has been struck.

It is well known that many fish are lost because of incorrect setting of the hook when a fish bites and the present devices overcomes this disadvantage by automatically setting the hook as soon as a fish disturbs the bait suspended from the line associated therewith.

Furthermore the device is foldable to a relatively small dimensions and includes means to store the component parts therein when in the folded position.

The device although designed primarily for ice fishing nevertheless can be used equally effectively while still fishing from the shore of a stream or lake or when trolling in a boat, one of the principal advantages being the fact that the fisherman's own rod and reel is used at all times.

The device is simple in construction, economical in manufacture, and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being Figures to the accompanying FIGS. in which:

DESCRIPTION OF THE DRAWINGS

In the drawings like characters of reference indicate corresponding parts in the different figures.

DETAILED DESCRIPTION

Figure 1:
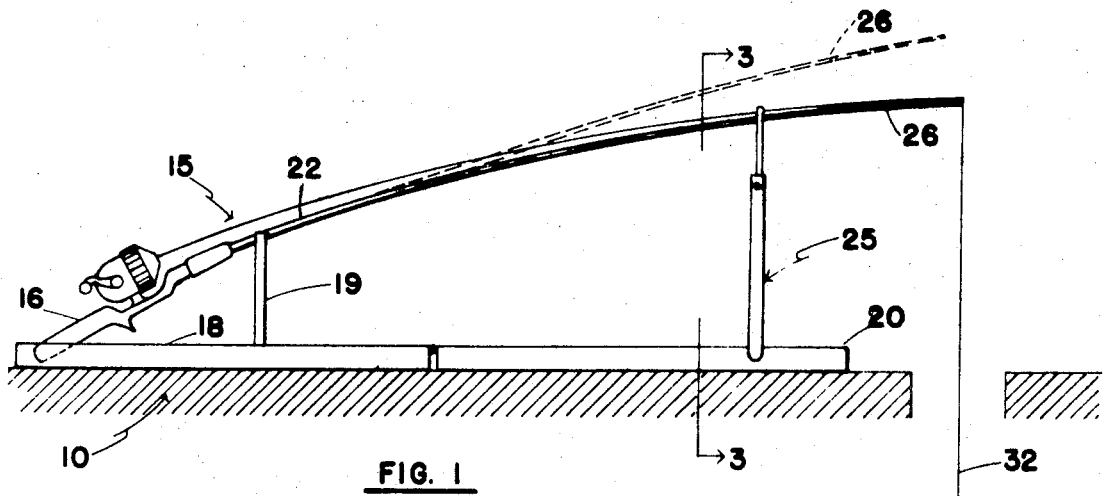
FIG. 1 is a side elevation of the device showing the rod in the fishing position.
Figure 2:
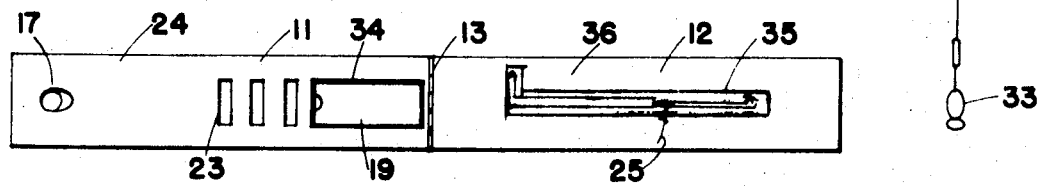
FIG. 2 is a top plan view of the device with the components stored therein.
Figure 4:
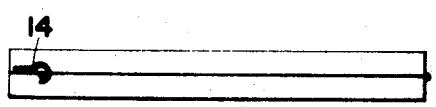
FIG. 4 is a side elevation of the device shown in the folded or stored position.

Proceeding therefore to describe the invention in detail, reference character 10 generally illustrates the device which comprises a base consisting of two portions 11 and 12 hingedly secured together transversely as at 13 so that they can either be extended to the position shown in FIG. 1 or, alternatively, folded to the position shown in FIG. 4, under which circumstances a catch arrangement 14 detachably maintains the device in the folded or stored position.

When in the position shown in FIG. 1, a conventional fishing rod and reel combination collectively designated 15 may be detachably secured thereto by engaging the butt 16 of the rod within a butt recess 17 formed adjacent one end 18 of the portion 11 of the base.

Means 19 is provided to support the rod along the length thereof at an inclined angle whereby the rod extends forwardly and upwardly from the end 18 of portion 11 towards the end 20 of portion 12.

Means 19 consists of a member substantially rectangular when viewed in cross section and having a notch 21 on the upper side thereof engageable by the portion 22 of the rod 15.

Member 19 is engageable in any one of a plurality of recesses 23 formed in the surface 24 of the base portion 11 and it will be appreciated that by varying the position of member 19, the angle of inclination of rod 15 is changed.

Means 25 is provided to detachably engage over the rod adjacent the tip end 26 thereof. Means 25 consists of a telescopic member 27, the base portion 28 of which is turned at right angles and engageable within an aperture in the base portion 12 thus giving a pivotal mounting to the member 25 within the side of the base portion 12 and adjacent the end 20 thereof.

The upper portion 29 of the member 25 is telescopically receivable within the power portion 28 and held by means of clamp screw 30 so that the length of member 25 may be adjusted within limits.

Figure 3:
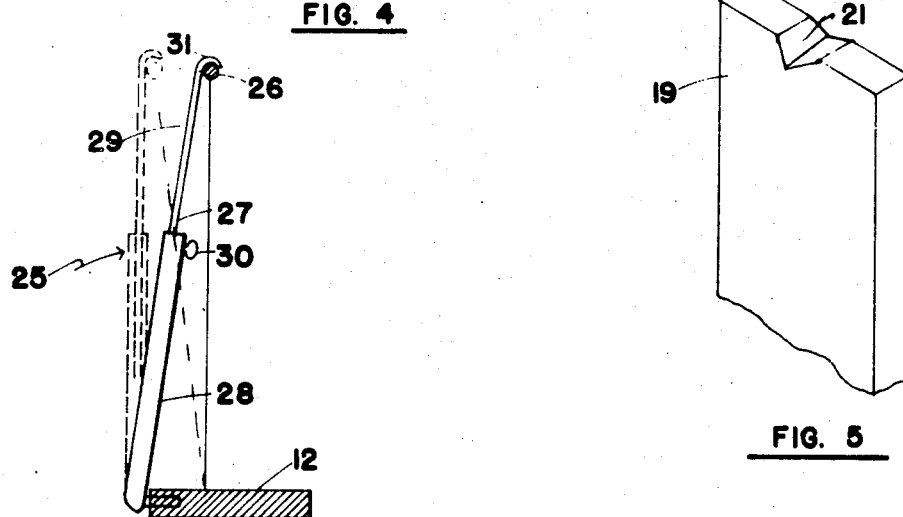
FIG. 3 is an end sectional view along the line 3—3 of FIG. 1.
Figure 5:
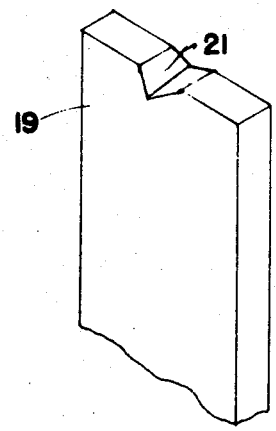
FIG. 5 is an isometric fragmentary view of one of the supports.

A hooked portion 31 is formed on the upper end of the portion 29 and is adapted to engage over rod 22 adjacent the tip end 26 thereof as clearly shown in FIGS. 1 and 3. Member 19 and the length of member 25 are adjusted so that when in position shown in FIG. 1, the rod is bowed downwardly or biassed downwardly against the natural resiliency of the rod which normally would extend in the direction shown in phantom in FIG. 1.

The associated line 32 is provided with a lure 33 on the lower end thereof in the usual manner.

When the hooked end 31 is engaged over the rod tip end 26 as shown in FIG. 3, member 25 is biassed inwardly towards the longitudinal axis of the base and this biasing is against the resiliency of member 25 which normally would be in the position shown in phantom in FIG. 3.

From the foregoing it will be appreciated that as soon as the bait 33 is attacked by a fish, the slightest downward movement of the rod tip end 26 will permit member 25 to move sideways to the position shown in phantom in FIG. 3 thus releasing the rod which in turn snaps upwardly to the position shown in phantom in FIG. 1 thus striking or setting the hook within the fish's mouth. The fisherman may then disengage the rod and reel combination 15 from the device and play the fish in the usual way until same is landed.

A rectangular recess 34 is formed within the surface 24 of portion 11 and member 19 normally rests within this when in the stored position.

A further recess 35 is formed in the surface or face 36 of the portion 24 and member 25 normally rests within this recess when the device is in the stored position. This enables the base to be folded to the position shown in FIG. 4 thus completely enclosing the component parts for transportation and storage.

Finally it should be appreciated that if a finer "bite" is required, the hooked end 31 may be arranged to engage the rod on the upper surface thereof rather than over the rod.

Also, instead of biassing the member 25 towards the center, it could be made rigid so that it remains in the position shown in phantom in FIG. 3. Under these circumstances, the rod itself is biassed over to engage the end 31 and the resiliency of the rod will disengage it from the member 25 as soon as a bite is received.

Various modifications can be made within the scope of the inventive concept which is herein disclosed and/or claimed.

What I claim as my invention is:

1. A device for holding fishing rods comprising in combination a base, means to hold the butt of the fishing rod adjacent one end of said base, means on said base to support the rod at an inclined angle whereby said rod inclines upwardly and forwardly from said one end of said base towards the other end thereof, and means to detachably hold the rod adjacent the tip end thereof, in a downwardly biassed position against the normal resiliency of said rod.

2. The device according to claim 1 in which said means to support said rod at an inclined angle includes a member extending upwardly from said base and being detachably secured to said base in one of a plurality of positions along said base.

3. The device according to claim 1 in which said means to detachably hold the rod adjacent the tip thereof includes a member pivotally secured by one end thereof to said base adjacent said other end of said base, said last member having means on the distal end thereof to hook over said rod, said member being normally biassed away from said rod whereby downward movement of said rod releases said hooked end which moves outwardly and away from said rod.

4. The device according to claim 2 in which said means to detachably hold the rod adjacent the tip thereof includes a member pivotally secured by one end thereof to said base adjacent said other end of said base, said last member having means on the distal end thereof to hook over said rod, said member being normally biassed away from said rod whereby downward movement of said rod releases said hooked end which moves outwardly and away from said rod.

5. The device according to claim 1 in which said base comprises two portions hingedly secured together and movable from a folded, stored position to an unfolded usable position, a depression formed in one of said portions detachably receiving said means to detachably hold said rod at an inclined angle and a further depression formed in one of said portions to detachably receive said means to detachably hold said rod adjacent the tip thereof, whereby said portions can be moved to said folded, stored position to enclose both of said means.

6. The device according to claim 2 in which said base comprises two portions hingedly secured together and moveable from a folded, stored position to an unfolded usable position, a depression formed in one of said portions detachably receiving said means to detachably hold said rod at an inclined angle and a further depression formed in one of said portions to detachably receive said means to detachably hold said rod adjacent the tip thereof, whereby said portions can be moved to said folded, stored position to enclose both of said means.

7. The device according to claim 3 in which said base comprises two portions hingedly secured together and movable from a folded, stored position to an unfolded usable position, a depression formed in one of said portions detachably receiving said means to detachably hold said rod at an inclined angle and a further depression formed in one of said portions to detachably receive said means to detachably hold said rod adjacent the tip thereof, whereby said portions can be moved to said folded, stored position to enclose both of said means.

8. The device according to claim 4 in which said base comprises two portions hingedly secured together and moveable from a folded, stored position to an unfolded usable position, a depression formed in one of said portions detachably receiving said means to detachably hold said rod at an inclined angle and a further depression formed in one of said portions to detachably receive said means to detachably hold said rod adjacent the tip thereof, whereby said portions can be moved to said folded, stored position to enclose both of said means.

9. The device according to claim 5 in which said means to detachably hold said rod adjacent the tip thereof is telescopic and adjustable in length within limits.

10. The device according to claim 6 in which said means to detachably hold said rod adjacent the tip thereof is telescopic and adjustable in length within limits.

11. The device according to claim 7 in which said means to detachably hold said rod adjacent the tip thereof is telescopic and adjustable in length within limits.

12. The device according to claim 8 in which said means to detachably hold said rod adjacent the tip thereof is telescopic and adjustable in length within limits.

* * * * *